Feb. 25, 1930.  A. O. AUSTIN  1,748,696
CABLE TERMINAL HOUSING
Filed Jan. 16, 1925  2 Sheets-Sheet 1

INVENTOR
Arthur O. Austin
BY Nissen & Crane
ATTORNEYS

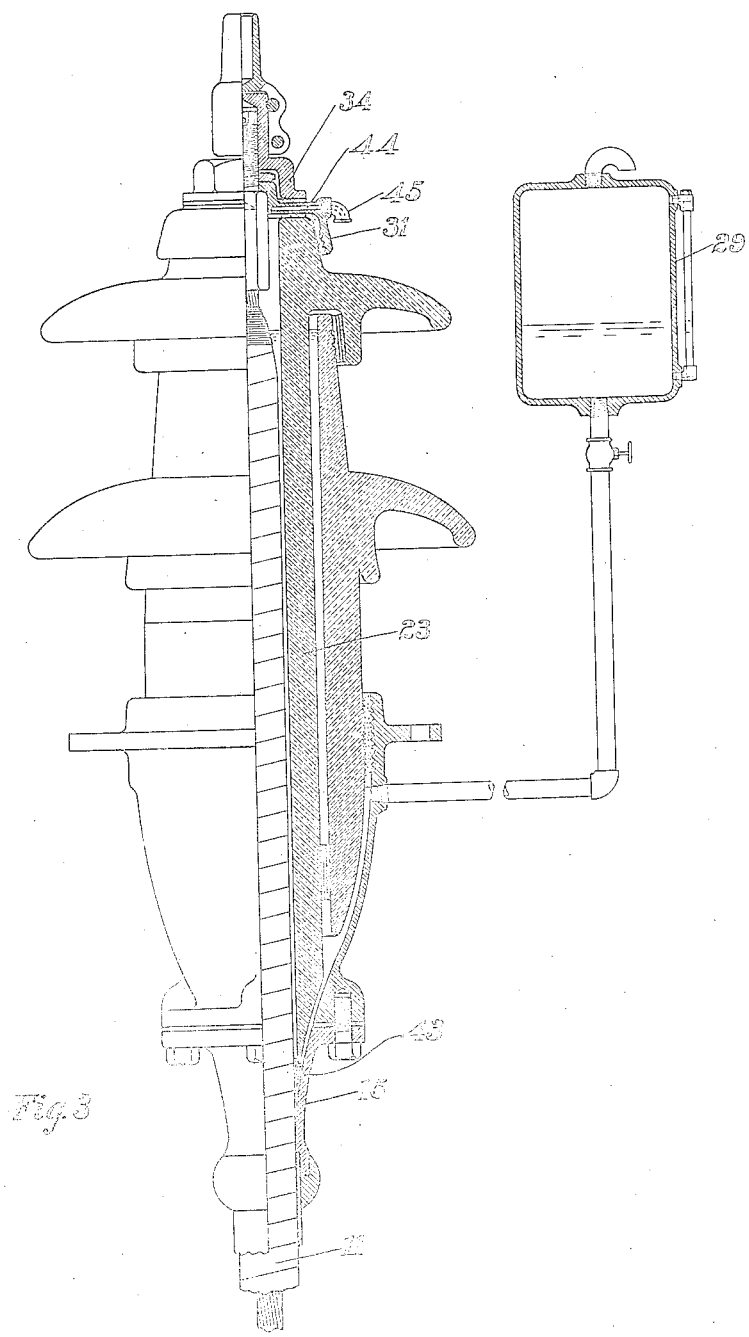

Patented Feb. 25, 1930

1,748,696

UNITED STATES PATENT OFFICE

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY

CABLE-TERMINAL HOUSING

Application filed January 16, 1925. Serial No. 2,755.

This invention relates to the form of housings for cable terminals commonly known as potheads, and has for its object the provision of such housings which may be readily adapted to cables of different sizes, which will obviate flash-over at the cable terminal, and which will protect the cable insulation and supply insulating compound thereto.

The invention is exemplified in the combination and arrangement of parts shown in the accompanying drawings and described in the following specifications and it is more particularly pointed out in the appended claims.

In the drawings—

Fig. 3 is a view similar to Fig. 1, showing a different modification.

Figures 1, 2:
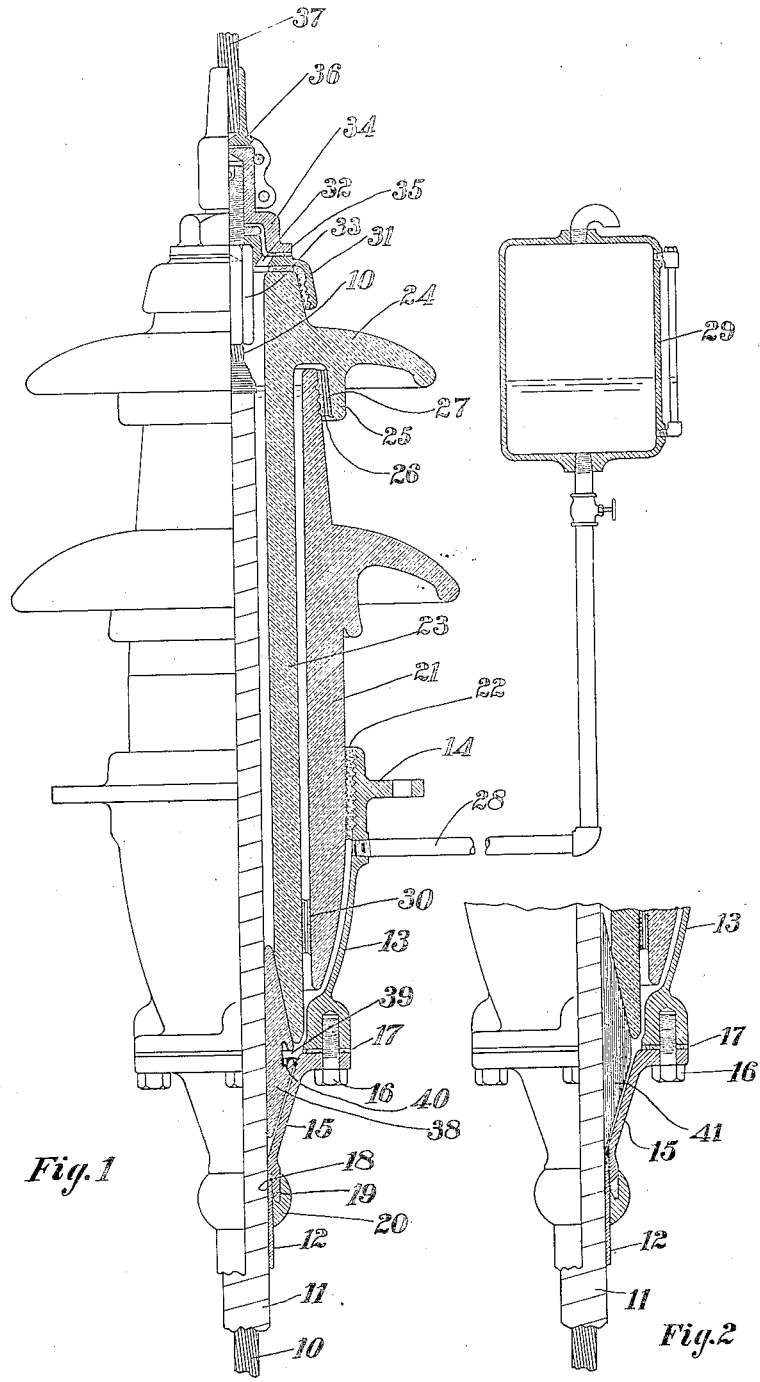
Fig. 1 is an elevation with parts in section showing one embodiment of the present invention.
Fig. 2 is a fragmentary elevation with parts in section showing a modified form of the invention.

High potential conductor cables are usually provided in addition to the conductor itself with a layer of insulating material and an outer metal sheath. The insulation may consist of wrappings of paper saturated with a suitable insulating compound. The outer sheath is commonly made of lead. It will be apparent that at the termination of the metal sheath there will be a concentration of electrostatic flux which has a tendency to cause discharges at this point. It will also, be readily understood that protection must be provided for the insulating wrapping where it is exposed at the end of the cable. In the accompanying drawings, the numeral 10 designates a conductor of an insulated cable having a covering of dielectric material 11 and an outer metal sheath 12. The terminal housing for the end of the cable includes a bell shaped metal casing member 13 open at its lower end to receive the cable and having an integral flange 14 at its upper end for supporting the housing. A thimble or collar 15 is secured to the lower end of the bell 13 by cap screws 16 and a gasket 17 is interposed between the thimble 15 and the metal housing 13 to insure a tight joint. The thimble 15 tapers inwardly toward the conductor 10 so as to fit closely against the outer surface of the dielectric covering 11. The lower end of the thimble 15 is provided with an offset recess 18 for receiving the end of the sheath 12 so as to bring the inner face of the sheath and the inner surface of the thimble flush with each other and provide a smooth opening which will closely fit the dielectric covering 11. A flange 19 is thus provided which over-laps the end of the sheath 12 and the edge of the flange is preferably beveled outwardly to facilitate easy entrance of the sheath 12 into the socket provided by the flange. In order to render the joint thus formed perfectly tight, it is preferably wiped as shown at 20 with lead or other suitable material for forming a wiped joint. It will be seen that the thimble 15 and the casing member 13 form a continuation of the sheath 12 which gradually diverges from the conductor 11 so that there is no abrupt break in the conductor which would give rise to electric discharges. To form a closed housing for the conductor, a tubular dielectric member 21 extends into the upper end of the casing member 13 and is cemented to the interior of the casing member at 22. A second tubular member 23 is provided within the member 21 and carries a flange 24 at its upper end and a downwardly extending collar 25 which receives the upper end of the member 21 and is secured thereto by a cemented joint 26. This joint 26 may be vented as shown at 27 to facilitate the escaping of air from between the members 21 and 23 when the housing is filled with an insulating compound. This filling may be done through a pipe 28 connected with the casing member 13 and provided with a reservoir 29 for containing a supply of the insulating liquid or compound. It will be understood that the compound with which the covering 11 is impregnated will contract and expand for temperature changes and a reserve supply of the compound is desirable to insure saturation of the dielectric covering, at all times. A second vented joint 30 is provided near the lower end of the member 21 to hold the members 21 and 23 in proper spaced relation to one another. The upper end of the member 23 is provided with a cap 31 having a vent 32 to facilitate entrance of the insulating compound into the space surrounding the conductor. The upper end of the conductor 10 is secured within a threaded terminal member 33 which is threaded into a cap 34 integrally closed at its upper end. The cap 34 makes a tight joint 35 with the upper face of the cap 31 so that there is no possibility of leakage through the connection about the terminal of the conductor. A split contact lug 36 is secured to the cap 34 and is connected with a conductor 37 which may lead either to a bus bar or overhead conductor. A ring 38 of insulation is interposed between the dielectric covering 11 and the thimble 15 to supplement the dielectric covering at the point where the outer casing diverges from the covering. This ring 38 is tapered at its lower end to fit within the tapered opening between the conductor and the thimble 15. The upper end of the ring 38 is also, preferably tapered to fit a flared opening at the lower end of the tubular member 23. An opening 39 may be provided in the outer face of the ring 38 and the inner surface of this opening may be covered with a coating 40 of conducting material to provide an insulated flux control by means of which the danger of electrical discharge is reduced. It will be understood that the lines of force emanating from the coating 40 will extend inwardly through the dielectric material 38, this material will prevent electrical discharge along these lines of force. The operation is similar to that described in my prior Patent No. 1,536,585 dated November 25, 1924. The construction readily adapts itself to cables of different sizes for the reason that the thimble 15 and the insulating ring 38 may be readily replaced by other fittings of the same nature but provided with the correct proportions for the particular sized cable used. The remaining parts of the housing may be the same for various sizes of cables.

In the form of the invention shown in Fig. 2, the ring 38 is replaced by a wrapping 41 of suitable dielectric material which may be wound upon the cable 11, paper, cambric, tape or other suitable material may be used for this purpose. The ring 38 will be made of porcelain or similar dielectric material. It will be noted that in either case, a smooth continuation of the inner surface of the sheath 12 is provided which gradually flares outwardly from the dielectric covering 11 and that the supplemental insulation extends well down into the tapered opening between the dielectric covering and the thimble 15.

Where the member 38 is made of a dielectric such as porcelain which has a dielectric flux constant approximately three times that of the cable insulation 11, the dielectric flux flows through the member 38 very readily and prevents charging current from flowing along the surface of the cable. As the diameter is increased, the sleeve 38 will take up more of the electrostatic stress. By the use of material which has high specific inductive capacity, it is possible to shorten the tapered portion of the pothead since the tapered sleeve may be flared much more rapidly than where a material of low specific inductive capacity is used.

In the form of the invention shown in Fig. 3, the inner tubular member 23, at its lower end is beveled on its outer face to fit the opening between the dielectric covering 11 and the thimble 15. Where this construction is used, the supplemental ring 38 is omitted but it may be found advisable in some cases to provide a dielectric packing 43 in the narrow portion of the opening between the thimble and the dielectric covering 11. In Fig. 3, a vent 44 is provided in the cap 31 which extends to the outer atmosphere instead of communicating with the interior of the cover cap 34. In the form shown in Fig. 1, the opening about the conductor within the tube 23 will be sealed at its upper end after the cover cap 34 is placed in its position. With this construction, this opening may be permanently filled, if desired, with a heavy insulating compound which will remain permanently in position independently of the supply from the reservoir 29.

In the form shown in Fig. 3, where the vent 41 communicates with the outer atmosphere, the level of the compound in the interior of the tube 23 will depend upon the level in the reservoir 29. A downwardly opening fitting 45 is provided to insure against the entrance of moisture through the vent 44.

I claim—

1. The combination with a conductor having a dielectric covering and an outer metal sheath, of a terminal housing having an opening for receiving said conductor and dielectric covering, a collar for closing the space in said opening about said dielectric covering, said sheath being terminated at said joint, means for forming a tight joint between said collar and sheath, said collar being tapered outwardly away from said dielectric covering and an insulating member having a tapered portion fitted into the space between said collar and dielectric covering.

2. In combination, a metallic casing member having an opening for receiving a cable, a tubular dielectric member within said casing member for surrounding said cable and a supplemental sleeve of dielectric material fitted about said cable and overlapping the end of said tubular dielectric member, said supplemental sleeve being removable to provide for the attachment of other sleeves having different sized cable entries.

3. In combination, a tapered metallic casing member having an opening for receiving a cable, a removable tapered collar for closing said opening about said cable and forming a continuation of said metallic casing member, means for forming a tight joint between the smaller end of said collar and said cable, a tubular dielectric member surrounding said cable within said metallic casing and a supplemental dielectric ring interposed between said cable and said collar and over-lapping said tubular dielectric member, said collar and supplemental dielectric ring being removable to provide for attachment of other collars and rings having different sized cable entries.

4. The combination with a cable having a dielectric covering of a casing member tapered at one end and having an opening for receiving said cable, a tubular dielectric member surrounding said cable within said casing and having a tapered opening in the end thereof and a supplemental sleeve of dielectric material having the walls thereof tapered in opposite directions to fit said casing and tubular dielectric member, said sleeve being removable to provide for attachment of other sleeves having different sized cable entries.

5. The combination with a cable comprising a conductor, a dielectric covering and an outer metal sheath, of a terminal housing for said cable comprising a metal casing member having an opening for receiving said cable, a collar for closing said opening, means for forming a tight joint between said collar and said sheath, said collar being gradually tapered outwardly from said dielectric covering, a tubular dielectric member within said metal casing and having the wall thereof tapered at its lower end, a supplemental dielectric ring interposed between said dielectric covering and the tapered portion of said collar and over-lapping the tapered portion of said tubular dielectric member and means for detachably connecting said collar to said metal casing member, said ring and collar being removable to provide for attachment of other rings and collars having different sized cable entries.

6. A pothead comprising a lower metal casing member, a dielectric tube extending into said casing member through one end thereof and connected to the interior of said casing member and a second dielectric tube disposed within said first named tube and having means thereon for forming a closure for the upper end of first named tube, the adjacent walls of said tubes being spaced apart, and an insulating fluid disposed in the space between said walls.

7. The combination with a cable having an outer metal sheath, of a pothead for said cable comprising a lower metal casing member attached to said sheath at the extremity of said sheath and gradually flared outwardly from said cable, a pair of concentric tubular dielectric members disposed within said metal casing member, and spaced from each other, an insulating fluid interposed between said tubular dielectric members, the outer one of said dielectric members being secured to said metal casing member while the inner one of said tubular members is provided with a flange for closing the upper end of said outer dielectric member, a cap for closing the upper end of said inner dielectric member and means for forming a tight joint between said cap and said conductor.

8. A pothead comprising a pair of concentric tubular dielectric members, a metallic casing member co-operating with the lower ends of said dielectric members to form a housing, means for supplying insulating liquid to the space between said dielectric members and a vented joint connecting said dielectric members at their upper ends.

9. A pothead comprising a dielectric casing member, a conductor arranged within said casing member, a cap secured to said dielectric casing member and connected with said conductor, a closure cap having an integrally closed upper end and secured to said conductor outside of said first named cap, said first named cap having a vent therein communicating with the interior of said closure cap and means for supplying insulating liquid to the interior of said dielectric casing member.

10. The combination with a cable having a dielectric covering and an outer metal sheath, of a pothead for said cable comprising a lower metal casing member having a tight joint with said sheath, a pair of concentric tubular dielectric members extending into said metallic casing member, a vented joint between said tubular dielectric members at their upper ends, a cap for closing the upper end of one of said dielectric members, said cap having a vent therein and means for supplying insulating material to the interior of said metallic casing member.

11. The combination with a conductor having an outer metal sheath of a terminal housing for said conductor connected with said metal sheath at the termination thereof, insulating material interposed between said housing and said conductor and a member of conducting material forming a flux control member embedded in said insulating material and extending inwardly from said housing toward said conductor.

12. The combination with a conductor having a dielectric covering and an outer metal sheath, of a terminal housing of conducting material secured to said sheath and gradually flared outwardly therefrom, an insulating member interposed between said conductor and said housing, and a supplemental insulating ring interposed between the outwardly flared portion of said housing and said conductor, said supplemental ring having a conducting member embedded therein and electrically connected with said housing to provide an insulated flux control member.

13. The combination with a conductor having a covering of dielectric material and an outer metal sheath, of a terminal housing for said conductor comprising an outwardly flared portion provided with a groove at its end for receiving the end of said sheath to form a smooth inner surface surrounding the dielectric covering for said conductor.

14. The combination with a conductor having a dielectric covering and an outer metal sheath of means for protecting said dielectric covering and preventing flash-over at the termination of said sheath, said means comprising a housing member of conducting material surrounding said dielectric covering and electrically connected with said sheath at the termination of said sheath, said housing member being gradually flared outwardly away from said dielectric covering, and a sleeve of dielectric material having higher specific inductive capacity than said dielectric covering and having a tapered portion extending into the tapered opening between said dielectric covering and housing member to a point closely adjacent the point where said housing member begins to flare outwardly.

15. The combination with a conductor having a dielectric covering and an outer metal sheath of a housing for said conductor adjacent the termination of said metal sheath, said housing comprising a metallic bell having a tight union with said sheath at the termination of said sheath, the dielectric covering for said conductor being extended intact into said bell, the smaller end of said bell closely surrounding said covering at the point where said bell joins said sheath and being gradually flared outwardly from the surface of said covering and a porcelain sleeve having a tapered end fitted closely into the tapered opening between the outer surface of said dielectric covering and the inner surface of said bell.

16. The combination with a conductor having a dielectric covering and an outer metal sheath, of means for protecting said dielectric covering and preventing flashover at the termination of said sheath, said means comprising an exterior casing wall having an end portion of conducting material surrounding said dielectric covering and electrically connected with said sheath at the termination of said sheath, the end portion of said casing wall being gradually flared outwardly away from said dielectric covering to serve both as a static distributor and outer casing wall for said covering, and a sleeve of rigid dielectric material having higher specific inductive capacity than said dielectric covering and having a tapered end extending into the tapered opening between said dielectric covering and said casing wall to a point closely adjacent the point where said casing wall begins to flare outwardly.

17. The combination with a conductor having a dielectric covering and an outer metal sheath, of means for protecting said dielectric covering and preventing flashover at the termination of said sheath, said means comprising a preformed sleeve of rigid dielectric material surrounding said dielectric covering and having a tapered end disposed adjacent the termination of said sheath, the material of said sleeve having a higher specific inductive capacity than that of said dielectric covering, and a covering of conducting material electrically connected with said sheath at the termination of said sheath and gradually flared outwardly from said dielectric covering, the tapered end of said dielectric sleeve extending into the tapered opening between said dielectric covering and said covering of conducting material to a point closely adjacent the point where said covering of conducting material begins to flare outwardly.

18. The combination with a cable having a dielectric covering and an outer metal sheath, of means for protecting said dielectric covering and preventing flashover at the termination of said sheath, said means comprising an outer casing wall having a rigid metal end portion surrounding said dielectric covering and electrically and mechanically connected with said sheath at the termination of said sheath and forming a tight joint therewith, the metal end portion of said casing wall being gradually flared outwardly away from said dielectric covering, and a preformed porcelain sleeve having a tapered end extending into the tapered opening between said dielectric covering and casing wall to a point closely adjacent the point where said wall begins to flare outwardly, said casing wall serving the double function of static distributor and casing wall and said porcelain sleeve providing a member of high specific inductive capacity for gradually taking up the electrostatic stress and relieving said dielectric covering.

19. In combination a tubular, dielectric member, a metallic casing enclosing one end of said dielectric member, and a conductor extending through said metallic casing into said dielectric member, said metallic casing being gradually flared outwardly from said conductor and secured to the outer surface of said tubular, dielectric member, said tubular, dielectric member having a sleeve projecting substantially to the small end of the flared opening between said casing and conductor.

20. In combination a tubular, dielectric member, a metallic casing enclosing one end of said dielectric member and having the edge thereof secured to the outer surface of said dielectric member, the end of said metallic casing opposite said edge being tapered inwardly and having an opening therein while said dielectric member is also tapered to fit closely within the tapered end of said casing and provided with a tapered dielectric sleeve portion projecting substantially to the small end of the tapered portion of said casing, and a conductor extending through said opening into said casing and tubular dielectric member.

21. The combination with a conductor having a covering of dielectric material, and an outer metal sheath, of a pothead comprising a metal casing contracted at one end and having an opening therethrough for receiving said conductor and dielectric covering, said metal sheath being secured to said casing adjacent to said opening and terminating short of the open space within said pothead, and a tubular dielectric member projecting into said casing at the opposite end thereof and provided with an annular sleeve extending to a position adjacent the inner end of said opening through the contracted end of said pothead and surrounding said conductor and dielectric covering, said casing being secured to the outer surface of said dielectric member to provide a housing for the portion of said conductor within said pothead.

22. In combination a conductor having an insulating covering and a metal sheath, of a pothead for housing the end of said conductor comprising a metallic casing member having an opening at one end through which said conductor and covering extend into said casing member, said metal sheath being terminated adjacent said opening and secured to the end of said casing member, said casing member being gradually tapered outwardly away from said insulating covering, a porcelain tube surrounding said insulating covering within said casing member and having the end thereof tapered to fit the tapered opening between said casing member and insulating covering, said porcelain tube being extended beyond said metallic casing member, a cap secured to the extended end of said porcelain tube and forming a terminal for said conductor, a second porcelain tube surrounding said first-named porcelain tube and having one end extending into said metallic casing member and having the other end attached to said first-named porcelain tube outside of said metallic casing member, said metallic casing member being secured to the outer face of the outermost porcelain tube between the ends thereof.

In testimony whereof I have signed my name to this specification on this 13th day of January, A. D. 1925.

ARTHUR O. AUSTIN.

CERTIFICATE OF CORRECTION.

Patent No. 1,748,696.  Granted February 25, 1930, to

ARTHUR O. AUSTIN.

It is hereby certified that error appears in the printed specification of the above numbered patent requiring correction as follows: Page 2, line 110, claim 1, strike out the words "said sheath being terminated at said joint" and insert the same after the word "sheath" in line 112, same claim; page 5, at the top, for patent number "1,778,696" read 1,748,696; and that the said Letters Patent should be read with these corrections therein that the same may conform to the record of the case in the Patent Office.

Signed and sealed this 9th day of February, A. D. 1932.

(Seal)

M. J. Moore,
Acting Commissioner of Patents.